UNITED STATES PATENT OFFICE.

SILVANUS F. VAN CHOATE, OF BOSTON, MASSACHUSETTS.

ART OF MAKING FILAMENTS FOR ELECTRIC LIGHTING.

SPECIFICATION forming part of Letters Patent No. 450,304, dated April 14, 1891.

Application filed May 31, 1890. Serial No. 353,868. (No specimens. Patented in England July 13, 1889, No. 11,300.

*To all whom it may concern:*

Be it known that I, SILVANUS F. VAN CHOATE, of Boston, in the county of Suffolk and State of Massachusetts, have invented new and useful Improvements in the Art of Making Filaments for Electric Lighting, (for which I have obtained a patent in Great Britain, No. 11,300, bearing date July 13, 1889,) of which the following is a specification.

This invention relates to improved filaments or burners for electric lighting (lamps) and the modes or methods, as well as the materials or substances, used in the manufacture and production of such filaments or burners; and the objects of my invention are to produce filaments that will be more durable and give a greater efficiency in light for a given expenditure of electrical energy, as well as a more desirable light, while the manufacture of such filaments will be attended with a higher mathematical precision than has heretofore been attained.

To these ends my invention consists in a novel employment and combination of materials forming a compound of vegetable and metallic substances, the latter substances being brought to a fluid state by dissolvents and then consolidated into a semi-metallic compound, the combination being aided by heat, electro-metallurgy, electro-chemistry, and thermo-electricity, all substantially as hereinafter described and set forth.

In my present invention and improvements it will be observed that I do not use ethylate, methylate, ether or wood spirit in any form, nor acid or acetate, nor sulphates or sulphur in any form, nor oxide or oxides, nor salt or any form of soda, nor chlorides or chlorine in any shape, nor any oxidizing substance. These substances would be deleterious to my filament. The chemicals I use in preparing my filament are used as dissolvents only. Neither do I use the electric current as a drying agent, but for electroplating purposes only.

In carrying out my invention other metallic compounds and solutions and materials may be used besides those herein specifically named—that is to say, I may use any solution of either iodine, alcohol, ammonia, or any other suitable dissolvent forming any iodine solution, or any ioduret or iodic compound—and combined with either aluminum or vanadium in any shape in forming compounds and solutions for dipping, impregnating, or electroplating filaments or the base or bases for filaments or burners for electric lighting; but more specifically speaking I prefer the materials and processes hereinafter named.

The base or foundation of my filament or burner may be composed of any suitable fiber or material and may be of any required form or size for the purpose desired. Any attenuated fiber or thread will answer.

The material or base of the filament is first soaked in a solution of ammonia (say three parts of water to two parts ammonia) for an hour or more, after which it is washed or rinsed in clean water, then boiled in water for an hour or more, then taken out and dried on a drum, reel, or otherwise, when it is ready for treatment with a semi-metallic solution formed substantially of one pound of absolute (or say 99.8) alcohol and three grains of crystallized iodine and two grains chemically pure aluminum, the latter being in the shape of thin sheets, filings, chips, or grains. The alcohol, iodine, and aluminum are put into an air-tight retort and their temperature slowly raised to, say, 170° Fahrenheit and kept so until the iodine and aluminum are entirely dissolved. The mixture is then allowed to cool, when it should be placed in an air-tight bottle and kept well sealed from air and moisture, so as to exclude it from the presence of oxygen. After the solution has cooled down to 45° Fahrenheit it should have a specific gravity of about .977, and then it is ready for use.

A portion of the solution is placed in a suitable vessel, and the filament or base is passed through it slowly; or it may be immersed or dipped in the solution and then dried by any desirable means. This process or its equivalent is repeated until the filament or base has become thoroughly impregnated with the substances contained in the solution. After this the filament or base is dipped in or passed quickly through a strong solution of practically pure ammonia, and then immediately dipped in or passed through a weak solution of starch or dextrine and water; but in preparing the starch no acid must be used. After this last treatment and while yet moist the filament or base may be passed through a die-plate of sapphire or other hard polished stone, which will give the filament or base its desired size and consolidate it into a smooth compact fiber, after which it is formed in the desired shape by any proper means, and then placed in a retort with pulverized plumbago and the retort cemented or luted air tight with clay or cement, and the whole heated in a furnace gradually to from 1° to 4,000° Fahrenheit and kept so for from three to four hours. This process completely fuses the iodine and aluminum into a tenacious filament or base of iodide of aluminum. The vegetable fiber or original material of the base having served as a carrier, former, or matrix for the metallic substance is mostly burnt out or turned into carbon dust, thus leaving a fibrous skeleton or filament of the metallic compounds as a base for the electro-deposition in the next step in the process. After the fusing process above mentioned the furnace and crucible are allowed to cool down, when the filament or base may be taken out and kept in an air-tight box or otherwise, excluding the air and moisture until subjected to the next step. The filament or base now being mostly deprived of carbon is substantially a concentrated fiber of the metallic substances of the solution, or in the form of an iodide of aluminum, or a metallic fiber of aluminum and iodine, and is in a proper state or condition to further receive and combine with the iodine and aluminum in the final processes of electro-metallurgy. The filament or base is now cemented or connected to the metallic terminal wires by electroplating or cementing the joints between the filament and the exterior wires or conductors by electroplating or deposition of a metallic cement upon the joints from a liquid metallic solution, instead of a cementing by carbon or hydrocarbon compounds. When these joints are cemented or connected with carbon or hydrocarbon compounds, a deposition of carbon is deposited in the joints. This the electric current soon disintegrates and the lamp case or bulb is soon blackened inside by the carbon. This is prevented by my invention of the use of a metallic cement, as a metallic cementing is the result instead of a carbon cementing. In making this joint the metal connections at the ends of the filament are joined together temporarily. The filament having been joined to the other ends of the wire terminals or tips by holes, tubes, or otherwise, the filament is held by tongs or suitable means at a distance from the joint desired to be plated or cemented with the metallic cement. When electrical contact between the source of the current and the filament has been completed, the current is turned on gently at first and increased until the joint has been satisfactorily cemented or plated over so as to secure proper contact and efficiency in service. The filament is now taken out and the upper ends or terminals separated, when it is ready for the final electro-metallurgy process. The filament is now secured or held by suitable tongs or means at points just above the cemented joints above described and proper connections made through the filament and connecting-wires to the electrical source and the current turned on, the filament being inclosed in a vessel or flask containing a portion of the iodine-and-aluminum solution, the air being exhausted from the flask or vessel by means of an air-pump or otherwise to a barometric pressure of from twenty to twenty-nine inches, for the purpose of excluding the oxygen in the air during the plating process. The filament is kept in circuit in this electroplating-bath until the resistance required to give the desired candle-power is mathematically determined by any suitable apparatus arranged for the purpose, after which the current is discontinued, and the filament after being tested and regulated for resistance is ready for use by inclosing in a case *in vacuo* or otherwise.

I wish it to be understood that the objects for electroplating, as well as the process in my invention, are entirely different from the objects in other processes heretofore employed, inasmuch as others have had for their object the cementing and filling up and hardening of a carbon filament with carbon from a hydrocarbon liquid and to increase the resistance, whereas in my invention the objects are not those at all. In my invention the electro-metallurgy is for the purpose of thoroughly coating the surface of the semi-metallic filament with the metallic substances from the solution to give endurance to the filament and to reduce a high resistance to a comparatively low resistance by means of the metallic coating from the iodine and metallic compounds taken up by the filament from the solution. My invention is a process of electro-metallic plating and cementing instead of a process of electro-deposition of carbon and carbon cementing.

My filament is not a carbon filament. The various processes it passes through brings it to the state of an iodide of aluminum, and the electric current passing through the filament causes a further deposition of a similar metallic nature from the solution to be combined with the substance of the base and also causes a homogeneous metallic surface to be formed upon the exterior by the iodine and aluminum or other metallic substances in the solution.

I wish it to be particularly observed, also, that whereas others have used in their treatment of filaments various substances—such as carbon or hydrocarbons, salts, acids, methyls, ethyls, wood-spirits, ether, sulphur, chlorine or chlorides, naphtha, and oxides of various forms—my process and invention contemplate the almost absolute elimination and non-employment of every one and all of the above substances, and all of which I disclaim, the main feature of my invention being the metallic cementing of the joints or connections, the employment and combination, all substantially in the manner above described, of one metallic and one semi-metallic and two chemical substances—viz., alcohol, ammonia, aluminum, and iodine. In the process the ammonia and alcohol are eliminated, the iodine and aluminum substantially and finally remaining. Iodine I call a "semi-metallic" substance, also in the nature of a chemical substance.

Having thus fully described my invention, what I claim, and desire to secure by Letters Patent, is—

1. A filament or base built up and composed of aluminum and iodine, in the manner and in the proportions substantially as herein stated.

2. The process of building up a filament or base by electroplating from a liquid solution composed of alcohol, iodine, and aluminum, substantially in the proportions stated.

3. The composition for treating, building up, and cementing filaments consisting of iodine and aluminum dissolved in alcohol, ammonia, or other dissolvent and deposited on said filament by a process of electro-metallurgy, substantially as described.

4. A liquid solution composed substantially in the proportion of one pound of alcohol, three grains of crystallized iodine, and two grains of aluminum, the iodine and aluminum being dissolved in the alcohol or other dissolvent, thus forming a metallic compound in solution for treatment of filaments, substantially as set forth.

5. The herein-described process for forming and building up the filament, consisting of first plating or cementing the joints between the filament and the connecting-wires, and, second, plating the filament by electro-metallurgy for reducing the resistance and giving endurance to the filament until the required degree of electrical resistance is obtained, substantially as described.

SILVANUS F. VAN CHOATE.

Witnesses:
J. M. HARTNETT,
HENRY W. WILLIAMS.